United States Patent
Osakabe

[19]
[11] Patent Number: 5,918,027
[45] Date of Patent: *Jun. 29, 1999

[54] DATA PROCESSOR HAVING BUS CONTROLLER

[75] Inventor: Takeshi Osakabe, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/764,587

[22] Filed: Dec. 13, 1996

[30] Foreign Application Priority Data

Dec. 15, 1995 [JP] Japan ..................... 7-347711

[51] Int. Cl.⁶ ............... G06F 13/38; G06F 13/14
[52] U.S. Cl. ............ 395/309; 395/287; 395/800.06; 370/347
[58] Field of Search .................. 395/325, 800, 395/309, 307, 800.01, 800.06; 364/200; 370/347

[56] References Cited

U.S. PATENT DOCUMENTS 4,766,538  8/1988  Miyoshi ................. 395/307
5,086,407  2/1992  McGarity et al. ........ 395/800.01
5,113,369  5/1992  Kinoshita .............. 395/309
5,293,562  3/1994  Pope .
5,359,717  10/1994 Bowles et al. .......... 395/309
5,568,490  10/1996 McNinch et al. ........ 370/58.2

FOREIGN PATENT DOCUMENTS 0 466 970 A1  1/1992  European Pat. Off. .
0 518 488 A1  12/1992 European Pat. Off. .
2176959       7/1990  Japan .

OTHER PUBLICATIONS

European Search Report, Apr. 16, 1997.

*Primary Examiner*—Ayaz R. Sheikh
*Assistant Examiner*—Frantz Blanchard Jean
*Attorney, Agent, or Firm*—McGinn & Gibb, P.C.

[57] ABSTRACT

A bus controller connects to external devices having both a separate-type bus interface and a multiplexed-type bus interface simultaneously by providing a dedicated address terminal and a time-division-multiplexed address/data terminal in the same bus controller. A selector connects a first address bus (A0 through A7) to the combined address/data terminal. Additionally, the first address bus is connected to the dedicated address bus terminal. Hence, the bus controller can interface with external devices designed for either type of terminal without requiring an adapter.

5 Claims, 7 Drawing Sheets

DATA PROCESSOR HAVING BUS CONTROLLER

BACKGROUND OF THE INVENTION

1. Field of the Invention

The present invention generally relates to a data processor, and more particularly to a data processor with an external bus interface.

2. Description of the Related Art

With diversification of systems using a data processor, a wide variety of equipment has been developed and produced as external devices for use around (or connected to) the data processor. These devices are typically referred to as "peripherals".

The bus interface for these sets of external devices is either a separate bus interface or a multiplexed bus interface which is used due to the limited number of terminals typically provided on the bus interface.

In a conventional data processor, typically only one type of bus interface is available, that is, either a separate (dedicated)-type or a multiplex-type. Therefore, if a bus conversion circuit is not used between a data processor and external equipment, a single data processor is unable to use an external device equipped with the other type of bus interface. Hereinbelow, a separate bus interface and a multiplex bus interface for the external bus interface of the conventional data processor, are described.

First, a conventional data processor having a separate bus interface circuit, includes at least a bus control unit (BCU) which controls the output and input of data and an execution unit (EXU) which controls execution of instructions, arithmetic operations, etc. The EXU also performs the writing of data to external equipment and the reading of data from the external equipment.

In the conventional data processor, the internal data signal of the BCU has an 8-bit width and the internal address width is assumed to be 16 bits. In the BCU, a first bus is an 8-bit (D0 through D7) data bus, a second bus is a low-order 8-bit (A0 through A7) address bus, and a third bus is a high-order 8-bit (A8 through A15) address bus. These first through third buses are connected to the EXU. Additionally, the first bus is connected to a data signal terminal, the second bus is connected to an address signal terminal, and the third bus is connected to an address signal terminal.

The operation of the conventional data processor is described hereinafter (as shown FIG. 2). First, time intervals T1–T4 indicate the timing of a clock (A) at which the data processor is synchronized, and these four timings comprise one bus cycle. At this time, the EXU performs the input of a data signal G (e.g., data input from external equipment) through the first bus (D0 through D7) at the timing T3. On the other hand, the EXU performs the output of a data signal H (e.g., data output with respect to external equipment) between timings T1 and T4.

The outputs of an address signal E (e.g., high-order address signals A8 through A15) and an address signal F (e.g., low-order address signals A0 through A7) are performed between timings T1–T4 through the second bus (A0 through A7) and the third bus (A8 through A15).

Additionally, the address signals E and F indicate the timing at which an address signal is output to the address signal terminals. Between timings T1 and T4, an address signal having a 16-bit width is output onto the second bus (A0 through A7) and the third bus (A8 through A15). The address signal, as it is, is output to the address signal terminals.

On the other hand, when a data signal is input and output, the data of an address specified by the address signal is input and output to the first bus (D0 through D7) from the external equipment connected to the data signal terminal. That is, a data G indicates the timing at which data is input from the data signal terminal to the bus control unit, and at timing T3, a data signal is input. Additionally, a data H indicates the timing at which data is output from the data signal terminal to the external equipment connected thereto, and between timings T1 and T4, a data signal is output.

A second conventional data processor includes a multiplex bus interface circuit and will be described below.

First, an EXU, a first bus (D0 through D7), a second bus (A0 through A7) 7, a third bus (A8 through A15), and an address signal terminal are the same as those described above, and for brevity such elements will not be discussed in detail. In a BCU of the data processor including the multiplex bus interface circuit, the first and second buses are connected together to the EXU. Accordingly, a total number of connecting lines between the BCU and an external device are less than the separate bus interface.

An Address Strobe (ASTB) signal, is output from the EXU, and is sent from an ASTB terminal which is an external terminal of the data processor to external equipment.

When the ASTB signal has a logic "1" level (e.g., a "high" level), it indicates the timing at which an address signal is output to a combined AD terminal (e.g., a combined address-signal and data-signal terminal). When the ASTB signal has a logic "0" level (e.g., a "low" level), it indicates the timing at which a data signal is input and output to the combined AD terminal.

The ASTB signal is input as a selection control signal to a selector which selects a data signal and a low-order address signal (A0 through A7). The selector connects the second bus (A0 through A7) to the combined AD terminal when the ASTB signal has a logic "1" level, and it connects the first bus (D0 through D7) to the combined AD terminal when the ASTB signal has a logic "0" level.

Hereinbelow, the operation of the conventional data processor including the multiplex-type I/O interface is described (as shown FIG. 2).

First, the time intervals T1–T4 indicate the timing of a clock (A) with which the data processor is synchronized, and these four timings form one bus cycle. The EXU inputs a data signal through the first bus (D0 through D7) at timing T3, and also outputs a data signal between timings T2 and T4. The output of an address signal, on the other hand, is performed between timings T1 and T4 through the second bus (A0 through A7) and the third bus (A8 through A15).

Additionally, a signal B is the timing of the combined AD terminal at the time of data input and C is the timing of the combined AD terminal at the time of data output. A signal D is an ASTB signal, which goes to a logic "1" level (e.g., a high level) at timing T1. Also, E is the timing of a signal of an address signal terminal, and the address signal terminal outputs the higher order 8 bits of the address signal between the timings T1 and T4.

If the ASTB signal first goes to a logic "1" level at timing T1, the combined AD terminal will be connected to the second bus (A0 through A7). Therefore, the lower order 8-bits signal of the address signal is output to the combined AD terminal.

Next, the ASTB signal is a logic "0" level (e.g., a low level) between timings T2 and T4, so the combined AD terminal is connected to the first bus (D0 through D7). The input of a data signal is performed at timing T3, and the output of the data signal is performed between timings T2 and T4. Additionally, the external equipment, connected to the data processor, is notified based on the level of the signal of the ASTB signal whether the signal, output to the combined AD terminal, is an address signal or a data signal.

As described above, the conventional data processor is fixed to either a separate bus interface or a multiplex bus interface. Therefore, when a system including both external equipment with a separate bus interface and external equipment with a multiplex bus interface is constructed with a single data processor, the external equipment must be connected between the data processor through a bus conversion circuit which synthesizes (e.g., multiplexes or selects between) an address signal and a data signal.

Likewise, if the data processor has only a multiplex bus interface, external equipment with a separate bus interface must be connected between data processors through a bus conversion circuit which separates an address signal and a data signal.

Thus, the conventional separate-type bus interface cannot be connected directly to external equipment having a multiplex-type bus interface. Additionally, the conventional multiplex bus interface cannot be connected directly to external equipment having a separate bus interface.

Attempts have been made at providing a combined system for separate-type bus and a multiplex-type bus systems. However, these systems have various problems.

Figure 1:
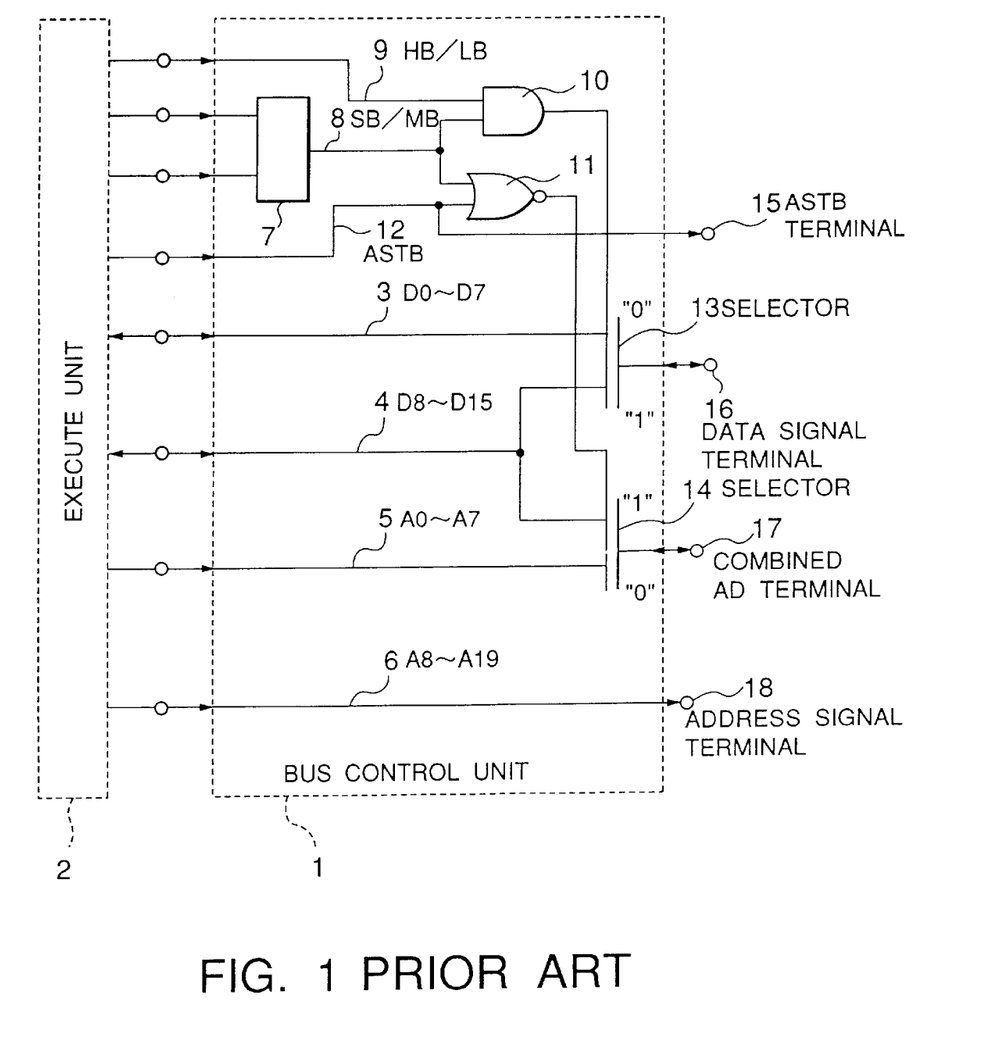
FIG. 1 illustrates a conventional external bus interface circuit of a data processor.

For example, as shown in FIG. 1, Japanese Patent Application Laid-Open No. 2-176959 discloses a bus selection circuit for both a separate-type bus control method and a multiplex-type bus control method.

Similarly to the conventional systems described above, the bus selection circuit includes a bus control unit (BCU) 1, an execute (execution) unit (EXU) 2, a data bus 3 for lower data bits (D0–D7), data bus 4 for upper data bits (D8–D15), an address bus 5 for lower address bits (A0–A7), an address bus 6 for upper address bits (A8–A19), an ASTB Terminal 15, a Data Signal Terminal 16, a Combined AD Terminal 17, and an Address Signal Terminal 18. Further, this bus control unit includes a flip-flop 7 for providing an output to an AND gate 10 and a NOR gate 11, as shown in FIG. 1.

This bus selection circuit is capable of switching between a separate bus interface and a multiplex bus interface, and is functional with bus interfaces of both types of interfaces with a single data processor by switching the separate bus interface and the multiplex bus interface with a value set in the flip-flop 7.

To switch the separate/multiplex control method, the execution unit 2 sets the flip-flop 7 to level 1 for a separate bus control system, or resets the flip-flop 7 to level 0 for a multiplex bus control system. The output signal of the flip-flop 7 is input as a selection signal to a selector (including the AND gate 10 and selector 13) for data signal selection (e.g., selection of the high-order-side data signal 4 and the low-order-side data signal 3), and to a selector (including NOR gate 11 and selector 14) for selecting a low-order-side address signal 5 and a high-order-side data signal 4 through a predetermined gate circuit.

Specifically, the AND gate 10 inputs an SB/MB signal 8 and an HB/LB signal 9 and controls the selector 13. The NOR gate 11 inputs the SB/MB signal 8 and the ASTB signal 12 and controls the selector 14 and the bus size of the data signal is varied without increasing the number of terminals to achieve the multiplex bus control system and separate bus control system by one microprocessor.

Figure 2:
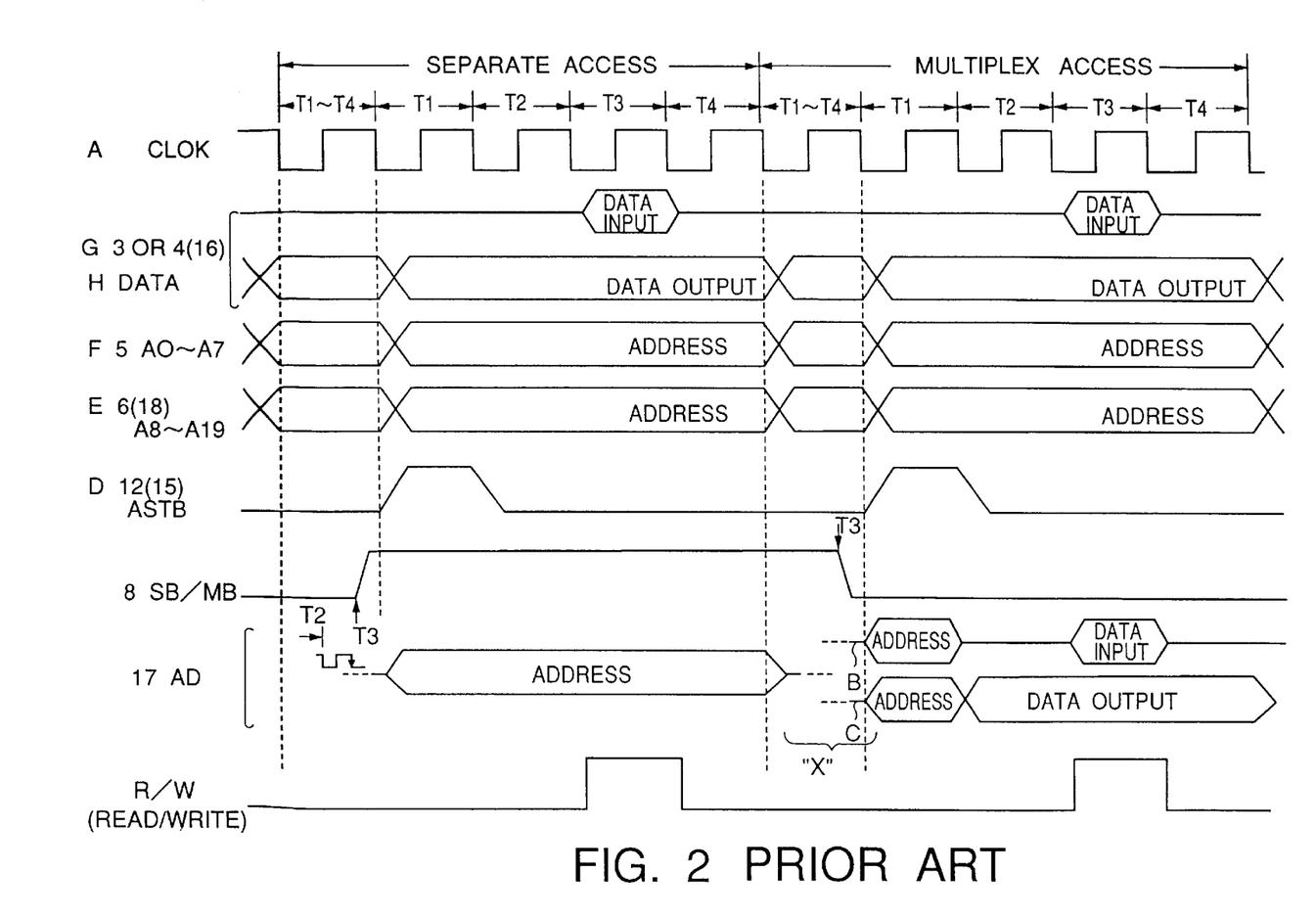
FIG. 2 is a timing diagram of the conventional external bus interface circuit shown in FIG. 1.

For example, when a separate-type I/O interface is to be connected, the flip-flop 7 is set, in accordance with the timing diagram shown in the left-hand portion of FIG. 2. Conversely, when a multiplex-type I/O interface is to be connected, the flip-flop 7 is reset in accordance with the right-hand side of FIG. 2.

However, while the bus selection circuit disclosed in the aforementioned Japanese Patent Application Laid-Open No. 2-176959 can be connected to both external equipment with a separate bus interface and external equipment with a multiplex bus interface by switching the separate bus interface and the multiplex bus interface, a full bus cycle (e.g., four clocks T1–T4 and designated as "X" in FIG. 2) is required to switch between the separate-type bus interface and the multiplex-type bus interface and vice versa. Thus, no read or write can occur during the bus cycle, and hence no read or write can be externally output. Thus, the switching operation is slow and switching from one type of bus interface to another (e.g., separate-type to multiplex-type) is cumbersome.

Therefore, the bus selection circuit is not connected to the separate-type bus interface and the multiplex-type bus interface simultaneously.

Additionally, a flip-flop is necessary, and the flip-flop must be set and reset each time the switching from one type of interface to another. Thus, the conventional structure becomes large and inefficient. SUMMARY OF THE INVENTION In view of the foregoing problems of the conventional systems, it is an object of the present invention to provide a data processor for controlling both a separate bus interface and a multiplex bus interface simultaneously, by sharing a terminal which outputs an address signal and a data signal and inputting and outputting the signals in a time-division manner.

Another object is provide a data processor for controlling both a separate bus interface and a multiplex bus interface simultaneously, and in which no bus cycles are lost due to switching between one type of interface to another.

Yet another object is to provide a data processor for controlling both a separate bus interface and a multiplex bus interface simultaneously, and which is not unduly large and complex.

To achieve the aforementioned objects, in a first aspect, the present invention provides a data processor in which address output timing and data input/output timing differ and which has an address signal terminal and a data signal terminal. The data processor includes a selector for selecting and outputting a data signal and part of an address signal, a combined address-and-data terminal connected to the output of the selector, wherein, when the selector selects the address signal, the selector outputs a first portion of an address field on the combined address-and-data terminal, and a first address terminal for outputting the first portion of the address field on a continuous basis, and a second address terminal for outputting a second portion of the address field on a continuous basis.

In a second aspect of the present invention, a bus control unit for connection to devices having both dedicated address terminals and multiplexed address/data terminals, is provided which includes a selector, a first address bus comprising a first field of an address and being connected to said selector, a data bus connected to the selector, a strobe signal generator for issuing a strobe signal and for selecting one of the data bus and the first address bus with the strobe signal, a first output terminal for outputting a signal on the selected one of the data bus and the first address bus, a first dedicated address output terminal, selectively coupled to the first address bus by the selector, for outputting the first field of the address, and a second data bus comprising a second field of the address being coupled to a second dedicated address output terminal for outputting the second field of the address.

In a third aspect, a processor system, includes an execution unit, and a bus control unit for receiving inputs from the execution unit, the bus control unit including a bus interface for selectively coupling the bus control unit to a peripheral including a separate-type input/output (I/O) bus interface, and for selectively coupling the bus control unit to a peripheral including a multiplex-type I/O bus interface.

In the present invention, the data processor may be equipped with a device for inhibiting, in the selector, selection of part of the address signal or the data signal. The selector may connect the data signal to the combined address and data terminal when the selection is inhibited.

With the above arrangement, the present invention allows simultaneous connection of external equipment provided with a separate bus interface and external equipment provided with a multiplex bus interface, and provides a data processor for controlling both a separate bus interface and a multiplex bus interface simultaneously, and in which no bus cycles are lost due to switching between one type of interface to another.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 3:
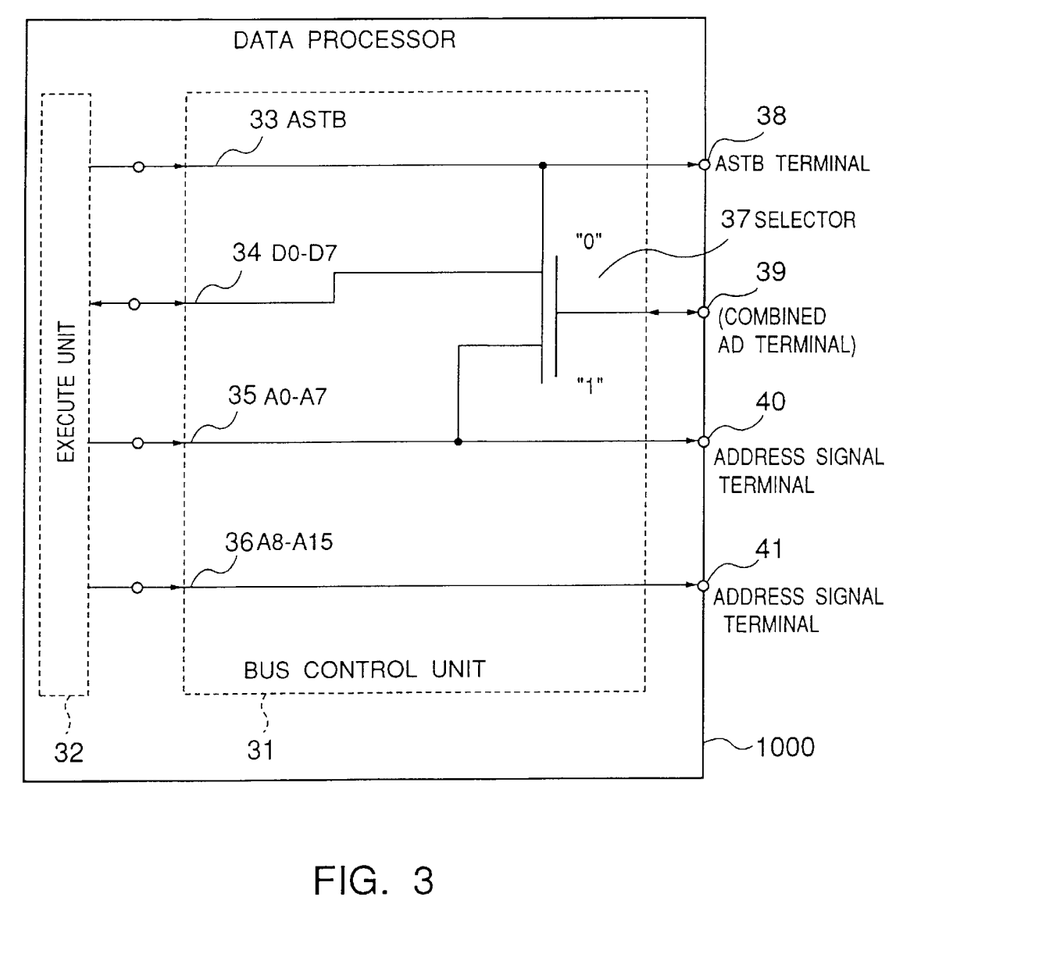
FIG. 3 illustrates an external bus interface circuit of a data processor according to a first embodiment of the present invention.

Referring now to the drawings, and more particularly to FIG. 3, there is shown a data processor 1000 according to a first embodiment of the present invention. This processor 1000 includes an execute unit (EXU) 32, a internal data bus (D0 through D7) 34, a internal address bus (A0 through A7) 35, a internal address bus (A8 through A15) 36, an address signal terminal 40, and an address signal terminal 41 are provided. Similarly, the ASTB signal (line) 33, 30 selector 37, and combined AD terminal 39 have the same functions as the those described above with regard to FIG. 1.

In a bus control unit (BCU) 31 of the data processor 1000 according to the present invention, the buses 34 through 36 are connected to the EXU 32. The ASTB signal 33 is a signal which is output from the EXU 32 and which is required of a multiplex-type bus interface.

When the ASTB signal 33 has logic "1" level (e.g., "HIGH"), it indicates the timing at which an address signal is output to the combined AD terminal 39, and when the ASTB signal 33 has a logic "0" level (e.g., "LOW"), it indicates the timing at which a data signal is input and output to the combined AD terminal 39. The address strobe (ASTB) signal 33 is input as a selection control signal of the selector 37 to which the data signal (D0 through D7) and the low-order bits (A0 through A7) of the address signal are input.

The selector 37 connects the address bus (A0 through A7) 35 to the combined AD terminal 39 when the ASTB signal 33 has a logic "1" level, and it connects the data bus (D0 through D7) 34 to the combined AD terminal 39 when the ASTB signal 33 has a logic "0" level.

Figure 7:
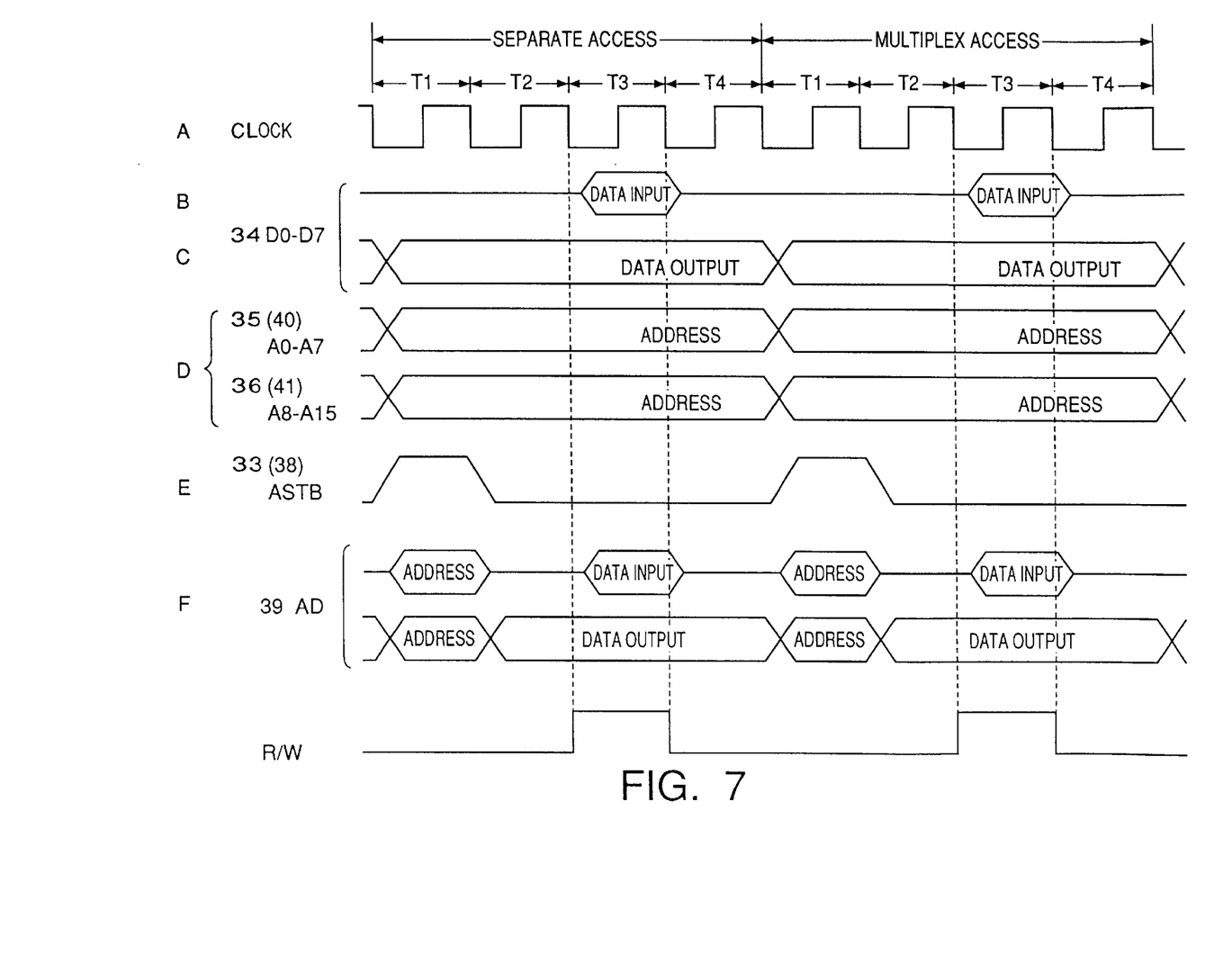
FIG. 7 is a timing diagram explaining the operation of the bus interface circuit according to the present invention, as shown in FIG. 3.

In operation, the timing of the ASTB terminal 38, the address signal terminal 40, the address signal terminal 41 and the timing of the combined AD terminal 39 are as shown in FIG. 7. It is noted that, in contrast to the conventional system, the signals of buses 34, 35, and 36, ASTB signal 33, and combined AD terminal 39 are the same regardless of the type of interface being connected thereto. However, in the conventional systems, these outputs are different (see especially combined AD terminal 41 of the conventional arrangement) depending on the type of interface being connected, as shown by comparing the timing diagrams of FIG. 7 with that of FIG. 2.

Further, there is no bus cycle required during switching from one type of bus interface to another, and no flip-flop is required in the embodiment of the present invention as shown in FIG. 3. Instead, one type of interface may be switched immediately to another without losing any timings of the bus cycle (let alone a complete bus cycle).

Figure 4:
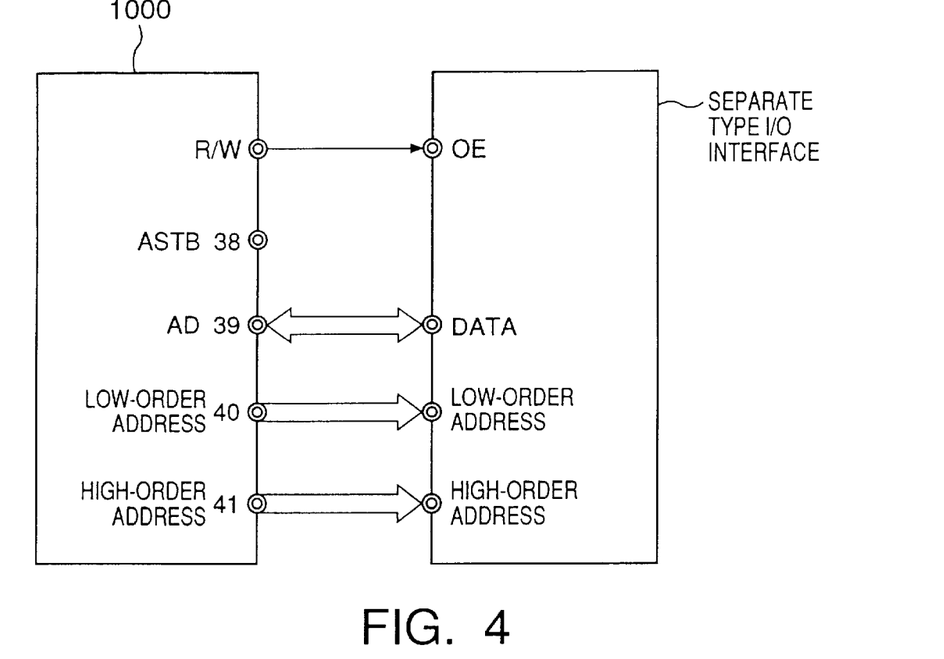
FIG. 4 is a diagram showing the external bus interface circuit being used for a separate-type I/O interface.

Prior to a discussion of the operation of the first embodiment and prior to examining the timing diagram of FIG. 7 in detail, the connection of only a separate-type bus interface to the present invention is shown in FIG. 4. Once again, it is noted that the first embodiment of the present invention does not require a flip-flop for such a connection.

Figure 5:
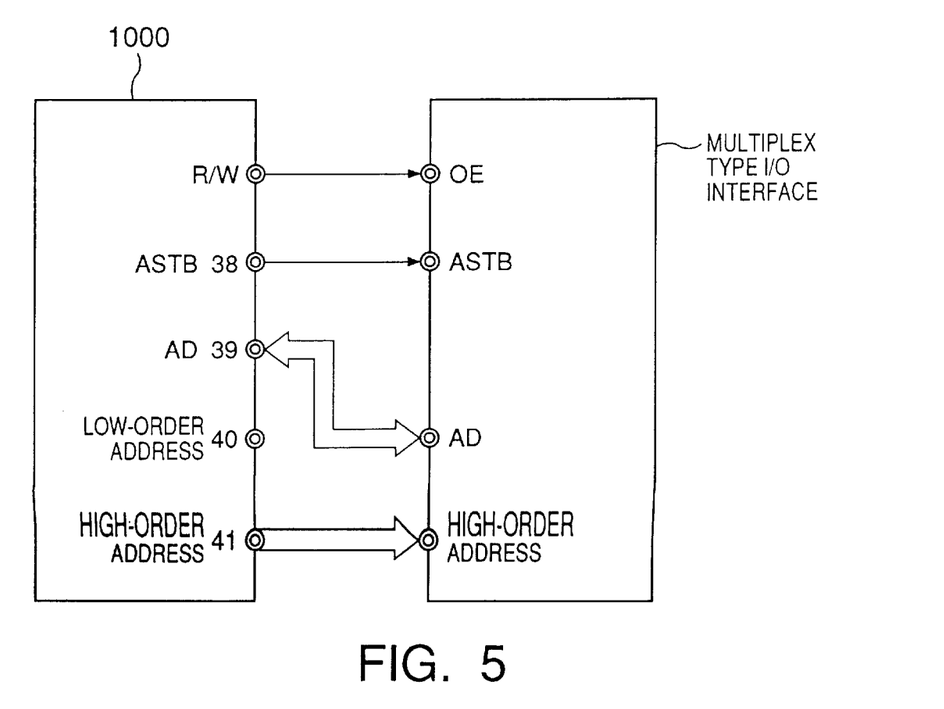
FIG. 5 is a diagram showing the external bus interface circuit being used for a multiplex-type I/O interface.
Figure 6:
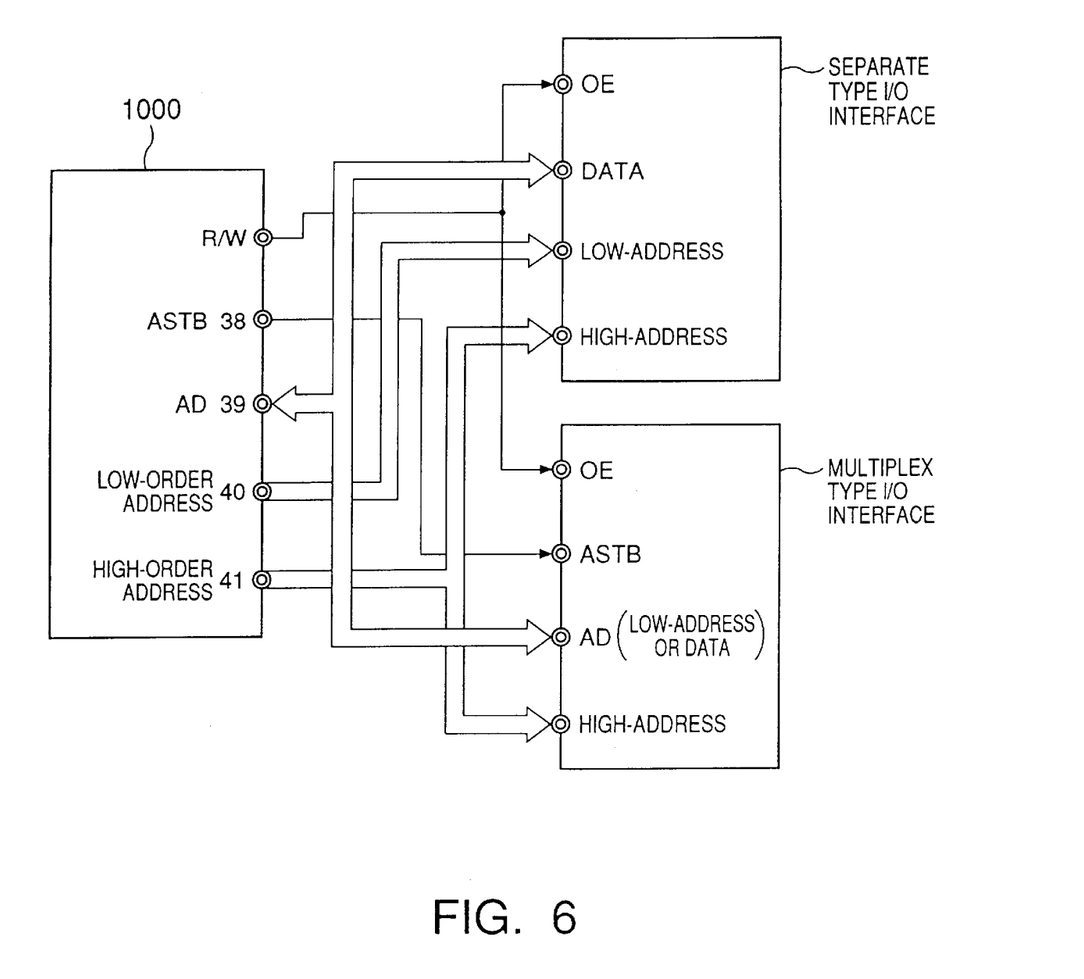
FIG. 6 is a diagram showing the external bus interface circuit being used for both a separate-type I/O interface and a multiplex-type I/O interface.

Further, FIG. 5 illustrates the connection of only a multiplex-type I/O interface to the present invention, whereas FIG. 6 illustrates the connection of the inventive bus control unit to a system having both the separate-type I/O interface and the multiplex-type bus interface.

Hereinbelow and referring to FIGS. 3 and 4, and the left-hand side of FIG. 7, the operation and connection of the separate-type bus interface is described. The separate-type bus interface uses the combined AD terminal 39, the address signal terminal 40, and the address signal terminal 41 as terminals. As to the output of the address signal, the lower order side (bits) and the higher order side (bits) of the address signal (A0 through A7 and A8 through A15) are output from the address signal terminals 40 and 41.

When a data signal is input and output, the data of an address specified by an address signal is input and output from external (peripheral) equipment connected to the combined AD terminal 39 to the bus (D0 through D7) 34.

That is, in the timing diagram of FIG. 7, data B indicates the timing of data input from the combined AD terminal 39 and the data signal is input at timing T3. Also, data C indicates the timing of data output from the combined AD terminal 39 and the data signal output between timings T2 and T4. The R/inverted W signal indicate a read and write control signal.

As shown in FIG. 7, while an address signal has been output from the combined AD terminal 39 at timing T1 when the ASTB signal 33 has a logic "1" level, there is no problem because the data processor 1000 provides the separate-type bus interface with the low-order address signal (A0 through A7) at timing T1–T4. In short, the external device can recognize the address signal at free timing.

Hereinbelow and referring to FIGS. 3 and 5, and the right-hand side of FIG. 7, the operation and connection of the multiplex-type interface in this embodiment is described. The multiplex interface uses the ASTB terminal 38, the combined AD terminal 39, and the address signal terminal 40 as terminals. Referring to right-hand side of FIG. 7, the ASTB signal 33 goes to a logic "1" level at timing T1, the combined AD terminal 39 is connected to the bus (A0 through A7) 35, and the low-order 8-bit signal of an address signal is output to the combined AD terminal 39.

Between timings T2 and T4, the ASTB signal 33 goes to a logic "0" level (low level) and the combined AD terminal 39 is connected to the bus (D0 through D7) 34. The input of the data signal through the combined AD terminal 39 from external equipment provided with a multiplex bus interface is performed at timing T3, and the output of the data signal to the external equipment provided with a multiplex bus interface is performed between timings T2 and T4, as shown in FIG. 7. Finally, the low-order-side address signal (A0 through A7) 35 and the data signal (D0 through D7) 34 is input and output from the combined AD terminal 39 on a time-division basis. The R/inverted W signal indicate a read and write control signal.

When the signals are input and output, the external equipment connected to the data processor 1000 will know from the signal of the ASTB signal 33 whether the signal, output to the combined AD terminal 39, is an address signal or a data signal.

Thus, this embodiment can control a separate-type bus interface and a multiplex-type bus interface at the same time. Therefore, in a system where peripheral equipment with a separate bus interface and external equipment with a multiplex bus interface co-exist, both types of bus interfaces can be directly connected in a single data processor, so the system cost can be reduced.

Further, the first embodiment does not require a flip-flop (and thus does not require a switching operation to set/reset the flip-flop) and further does not require a full bus cycle (e.g., four clocks T1–T4) between switching from a separate-type I/O interface to a multiplex-type I/O interface, as in the conventional system. Thus, a read or write can occur during this bus cycle, and no time is lost. Hence, the structure of the invention is made small and the entire circuit can be down-sized.

Second Embodiment

Figure 8:
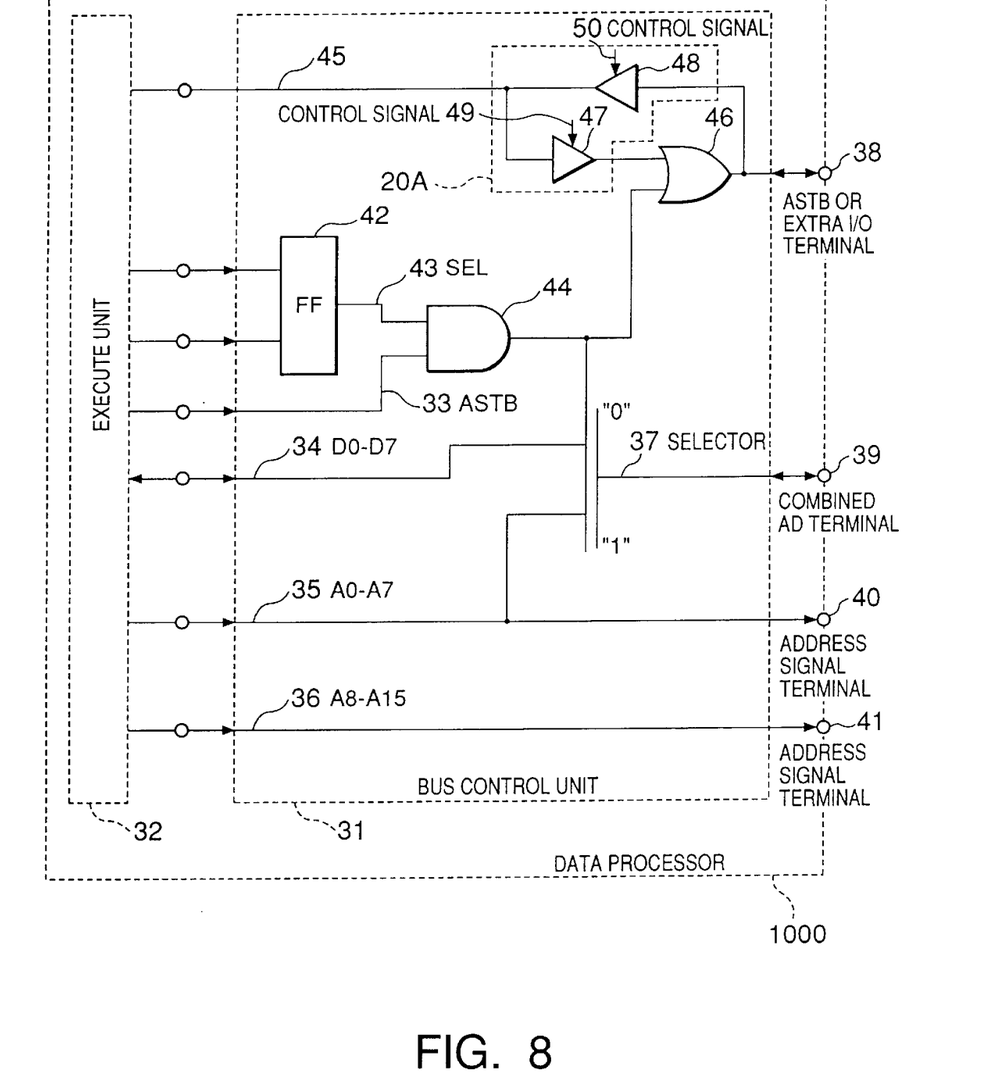
FIG. 8 illustrates an external bus interface circuit of a data processor according to a second embodiment of the present invention.

FIG. 8 illustrates an external bus interface of a data processor 1000 according to a second embodiment of the present invention. In FIG. 8, the same reference numerals will be applied to elements having the same functions as FIG. 3 referred to above.

Briefly, a key feature of the second embodiment as shown in FIG. 8 is that the operator can choose to use the BCU 31 in a separate-only mode or a separate/multiplex mode as described above with regard to the first embodiment. The modes are selected by a R-S flip-flop 42 discussed in greater detail below. Specifically, the separate/multiplex mode is selected by setting the flip-flop 42, and the separate-only mode is selected by resetting the flip-flop. Thus, a terminal is made available for use, and is not used exclusively (e.g., dedicated) for the ASTB signal 33 as in the first embodiment. This allows the user greater flexibility.

Thus, with the second embodiment, the ASTB terminal 38 is freed up for other uses and purposes, and thus it is simply not dedicated to being a ASTB terminal 38. Additionally, the system can be selectively used in the separate-only mode, as in the conventional system discussed above, or in the separate/multiplex mode described above.

Referring to FIG. 8, the structure of the second embodiment differs from the first embodiment by the provision of a flip-flop (FF) 42, a 2-input AND gate 44, a two-input OR gate 46 and a buffer arrangement 20A.

The flip-flop (FF) 42 is preferably a set/reset (S-R) FF which is controlled to a logic "1" level by the EXU 32 when a multiplex bus interface is used and which is controlled to a logic "0" level when a multiplex bus interface is not used (e.g., a separate-type bus interface is used).

The output signal (SEL) 43 of the FF 42 indicates the selection of a separate/multiplex bus when it has a logic "1" level and the selection of only a separate bus interface when it has a logic "0" level. The SEL signal 43 is for switching a separate bus interface and a separate/multiplex bus interface. The 2-input AND gate 44 has inputted thereto an address strobe (ASTB) signal 33 and the SEL signal 43 from the FF 42, and the logical product output is input to the selector 37 as a selection control signal.

Further, to free a terminal for other purposes (and thus not simply to have a terminal dedicated to being the ASTB terminal), a bus 45 is provided and controlled by the EXU 32. The bus 45 is coupled to a buffer arrangement 20A formed of delay elements (e.g., buffers 47 and 48) configured as shown. Buffers 47, 48 are input with control signals 49, 50, respectively.

Hereinbelow, the operation of the second embodiment is described. The operation of this embodiment differs with respect to only the control of the selector 37 and the use of the buffer arrangement 20A with the bus 45, as compared with the aforementioned first embodiment, and therefore for brevity a description other than the control of the selector 37 is omitted.

When the separate/multiplex bus interface is selected, the EXU 32 outputs a signal to set the FF 42 in response to an instruction. The FF 42 is set and the SEL signal 43 which is the output signal goes to a logic "1" level. The output of the 2-input AND gate 44 goes to the same level as the logic level of the ASTB signal 33.

That is, as with the aforementioned first embodiment, when the ASTB signal 33 is a logic "1" level, the output of the 2-input AND gate 44 goes to a logic "1" level and the selector 37 connects the low-order-side address bus (A0 through A7) 35 to the combined AD terminal 39. When the ASTB signal 33 is a logic "0" level, the output of the 2-input AND gate 44 goes to a logic "0" level and the selector 37 connects the data bus (D0 through D7) 34 of the data signal to the combined AD terminal 39.

In contrast, when only the separate bus interface is selected, the EXU 32 outputs a signal to reset the FF 42 in response to an instruction, etc. The FF 42 is reset, and the SEL signal 43 goes to a logic "0" level. The output of the 2-input AND gate 44 is fixed at a logic "0" level. The selector 37 always connects the data bus (D0 through D7) 34 of the data signal to the combined AD terminal 39, and the operation will become the same as in the conventional separate bus interface. Thus, the bus control unit can be used in a separate-only mode in which the strobe is turned off (FF 42 is reset) or in a separate/multiplex mode in which the strobe is turned on (FF 42 is set).

Additionally, the bus 45 provides an input to the buffer arrangement 20A. The buffers 47, 48 selectively receive a control signal 49, 50 for actuation, depending upon, for example, whether a separate-type I/O interface is being connected or a multiplex-type I/O interface is being connected, and thus depending upon whether the ASTB terminal 38 is required or not.

The OR gate 46 receives an output from the AND gate 44 and the output of the buffer 47 to thereby provide a logical product output to the terminal 38. If the terminal is not required to be used as an ASTB terminal, then the terminal 38 can be used for another purpose such as usage as another I/O terminal. Thus, the efficiency and performance of the system are increased.

It is noted that this structure can be suitably employed in the separate-only mode (e.g., strobe signal is turned "OFF"; FF42 is in the "RESET" mode) or in the separate or multiplex (e.g., FF 42 is "SET") mode.

Further, in the second embodiment, the ASTB terminal 38 is constructed so as not to have a combined function. However, when the embodiment is used with only the separate bus interface, the ASTB terminal 38 becomes unnecessary, and thus it is similarly unnecessary to mention that the terminal can be used with an additional function assigned to it.

As described above, according to the present invention, the external bus interface separates and has a terminal for outputting an address signal, and a terminal for inputting and outputting a data signal, and a selector switches the address signal and the data signal.

The selector is switched on a time-division basis by a signal indicating whether the address signal is output or the data signal is input and output, and the address signal or the data signal is input and output from a terminal which inputs and outputs data. With this arrangement, the invention is advantageous in that the multiplex bus interface and the separate bus interface are controlled simultaneously with a single data processor.

That is, according to the present invention, both the multiplex bus interface and the separate bus interface can be controlled simultaneously. Therefore, a system provided which is freely connected to both external equipment with a multiplex bus interface and external equipment with a separate bus interface.

While the invention has been described in terms of several preferred embodiments, those skilled in the art will recognize that the invention can be practiced with modification within the spirit and scope of the appended claims. For example, the internal width of the BCU can be suitably modified to be greater than or less than 16-bits, and thus is not limited to 16-bits.

Having thus described my invention, what I claim as new and desire to secure by Letters Patent is as follows:

1. A bus controller driving a bus in response to an address strobe signal, a data signal and an address signal, said address strobe signal taking a first logic level indicative of outputting said address signal and a second logic level indicative of outputting said data signal, said address signal including first and second portions, said bus controller comprising:
a first input node supplied with said address strobe signal;
a set of second input nodes supplied with said data signal;
a set of third input nodes supplied with said first portion of said address signal;
a set of fourth input nodes supplied with said second portion of said address signal;
an address strobe terminal coupled to said first input node such that said address strobe signal appears at said address strobe terminal;
a set of first terminals;
a selector coupled to said first input node, said set of second input nodes, said set of third input nodes and said set of first terminals, said selector forming an electrical path between said set of third input nodes and said set of first terminals in response to said first logic level of said address strobe signal to allow said first portion of said address signal to appear at said set of first terminals during said first logic level of said address strobe signal, and forming an electrical path between said set of second input nodes and said set of first terminals in response to said second logic level of said address strobe signal to allow said data signal to appear at said set of first terminals during said second logic level of said address strobe signal;
a set of second terminals coupled to said set of third input nodes such that said first portion of said address signal appears at said set of said second terminals not only when said address strobe signal takes said first logic level but also when said address strobe signal takes said second logic level; and
a set of third terminals coupled to said set of fourth input nodes such that said second portion of said address signal appears at said set of third terminals.

2. The bus controller as claimed in claim 1, wherein said first portion of said address signal has a number of bits equal to a number of bits of said data signal.

3. The bus controller as claimed in claim 2, wherein said first portion of said address signal comprises a low order of said address signal, and said second portion of said address signal comprises a high order of said address signal.

4. The bus controller as claimed in claim 1, wherein said address strobe terminal, said set of first terminals and said set of third terminals are selectively coupled through a control line, a first bus and a second bus to an address strobe input terminal, a set of address/data multiplex input terminals and a set of address input terminals of a multiplex-type peripheral unit, respectively, and said sets of first, second and third terminals are selectively coupled through said first bus, a third bus and said second bus to a set of data input terminals, a set of first address input terminals and a set of second address input terminals of a separate-type peripheral unit, respectively.

5. The bus controller as claimed in claim 4, wherein said bus controller is employed in a system which equips both said multiplex-type peripheral unit and said separate-type peripheral unit.

* * * * *